US009712382B2

(12) United States Patent
Tsai

(10) Patent No.: US 9,712,382 B2
(45) Date of Patent: Jul. 18, 2017

(54) RETRIEVING CONSOLE MESSAGES AFTER DEVICE FAILURE

(71) Applicant: Quanta Computer Inc., Tao Yuan Shien (TW)

(72) Inventor: Chin-Fu Tsai, Taoyuan County (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 14/524,973

(22) Filed: Oct. 27, 2014

(65) Prior Publication Data

US 2016/0119180 A1    Apr. 28, 2016

(51) Int. Cl.
*H04L 12/24* (2006.01)
*G06F 11/07* (2006.01)

(52) U.S. Cl.
CPC ........ *H04L 41/069* (2013.01); *G06F 11/0745* (2013.01); *G06F 11/0787* (2013.01)

(58) Field of Classification Search
CPC ............ G06F 11/0757; G06F 11/0778; G06F 11/1417; G06F 11/1428; G06F 11/2025; G06F 11/3034; G06F 11/3082; G06F 11/3476; G06F 17/3068; G06F 11/0745; G06F 11/0787; H04L 41/069
USPC ................ 370/216, 241, 242; 709/223, 224; 719/318; 714/13
See application file for complete search history.

(56) References Cited

U.S. PATENT DOCUMENTS

| 5,023,779 A | 6/1991 | Federico et al. |
| 6,012,152 A | 1/2000 | Douik et al. |
| 6,438,707 B1 | 8/2002 | Ronstrom |
| 6,701,449 B1 | 3/2004 | Davis et al. |
| 6,959,403 B2 | 10/2005 | Dierauer et al. |
| 7,123,877 B2 | 10/2006 | Lin |
| 7,233,977 B2 | 6/2007 | Gupta et al. |
| 7,437,258 B2 | 10/2008 | Robertson et al. |
| 7,552,138 B2 | 6/2009 | Nemoto et al. |
| 7,565,567 B2 | 7/2009 | Ross |
| 7,739,546 B1 * | 6/2010 | Rodrigues ........... G06F 11/1662 714/13 |
| 8,015,445 B2 | 9/2011 | Ando |

(Continued)

FOREIGN PATENT DOCUMENTS

| JP | 2006268742 | 10/2006 |
| JP | 2009252188 | 10/2009 |

OTHER PUBLICATIONS

Extended European Search Report mailed on Oct. 26, 2015 in European Application No. 15169361.1-1953.

*Primary Examiner* — Joshua Kading
(74) *Attorney, Agent, or Firm* — Nixon Peabody LLP; Zhou Lu

(57) ABSTRACT

A service controller of a computing device can store console messages so that an external management device can retrieve the console messages after a malfunction or crash of the computing device. For example, the service controller can be configured to redirect serial output (e.g., console messages, system log messages, system error message, etc.) to a network interface controller for transmission over a network connection. The service controller can be configured to store the console messages in non-volatile memory of the service controller. The service controller can receive a request for the stored console messages and transmit the stored console messages to an external device.

22 Claims, 6 Drawing Sheets

(56) References Cited

U.S. PATENT DOCUMENTS

| | | | |
|---|---|---|---|
| 8,417,774 B2 | 4/2013 | Flynn et al. | |
| 8,661,306 B2 | 2/2014 | Zhang et al. | |
| 2001/0044841 A1* | 11/2001 | Kosugi et al. | 709/223 |
| 2002/0194392 A1* | 12/2002 | Cheng et al. | 709/318 |
| 2004/0019834 A1 | 1/2004 | Chan et al. | |
| 2005/0267956 A1* | 12/2005 | Huang | 709/223 |
| 2006/0085690 A1* | 4/2006 | Bolen et al. | 714/39 |
| 2008/0059784 A1* | 3/2008 | Fu | H04L 12/66 713/2 |
| 2008/0115015 A1* | 5/2008 | Ikezawa et al. | 714/42 |
| 2009/0006915 A1* | 1/2009 | Gomez et al. | 714/727 |
| 2009/0089624 A1* | 4/2009 | Austen et al. | 714/39 |
| 2009/0113194 A1 | 4/2009 | Orita et al. | |
| 2009/0132799 A1* | 5/2009 | Brumley et al. | 713/100 |
| 2010/0281246 A1* | 11/2010 | Bristow et al. | 713/100 |
| 2010/0306763 A1* | 12/2010 | Lambert | G06F 9/45533 718/1 |
| 2012/0151233 A1 | 6/2012 | Chao | |
| 2012/0173922 A1* | 7/2012 | Cheng et al. | 714/13 |
| 2013/0179566 A1 | 7/2013 | Jreij et al. | |
| 2013/0326278 A1* | 12/2013 | Yin et al. | 714/38.1 |
| 2014/0098821 A1 | 4/2014 | Dharmadhikari et al. | |
| 2014/0101653 A1 | 4/2014 | Dharmadhikari et al. | |
| 2014/0122421 A1* | 5/2014 | Furukoshi | 707/609 |
| 2014/0344431 A1* | 11/2014 | Hsu | H04L 41/044 709/223 |
| 2015/0363340 A1* | 12/2015 | Kelly | G06F 13/102 710/52 |

* cited by examiner

RETRIEVING CONSOLE MESSAGES AFTER DEVICE FAILURE

FIELD OF THE INVENTION

Embodiments generally relate to redirecting console messages over a network from a computing device.

BACKGROUND

Serial over LAN (SOL) is a mechanism that enables the input and output of the serial port of a computing device to be redirected over a network using IP (Internet Protocol). Often the output of the serial port is console messages (e.g., log messages, lines of text) that can be used by a system administrator to debug problems with the computing device. For example, when a computing device (e.g., server) crashes, the computing device will generate console messages leading up to the crash that can give clues as to the cause of the crash. If a system administrator is monitoring the console messages (e.g., on a local console connected to the computing device, on a remote console connected to the computing device using SOL), then the system administrator will be able to receive and use the console messages to debug the problem with the computing device. If the system administrator is not monitoring or not connected to the computing device to receive the console messages, the console messages may be lost because the console messages are merely streamed out and not stored. If the console messages are lost, the system administrator will not be able to debug the problem with the computing device based on the console messages.

SUMMARY

In some embodiments, a service controller of a computing device can store console messages so that an external management device can retrieve the console messages after a malfunction or crash of the computing device. For example, the service controller can be configured to redirect serial output (e.g., console messages, system log messages, system error message, etc.) to a network interface controller for transmission over a network connection. The service controller can be configured to store the console messages in non-volatile memory of the service controller. The service controller can receive a request for the stored console messages and transmit the stored console messages to an external device.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

Various embodiments or examples of the invention are disclosed in the following detailed description and the accompanying drawings.

Like reference symbols in the various drawings indicate like elements.

DETAILED DESCRIPTION

Figure 1:
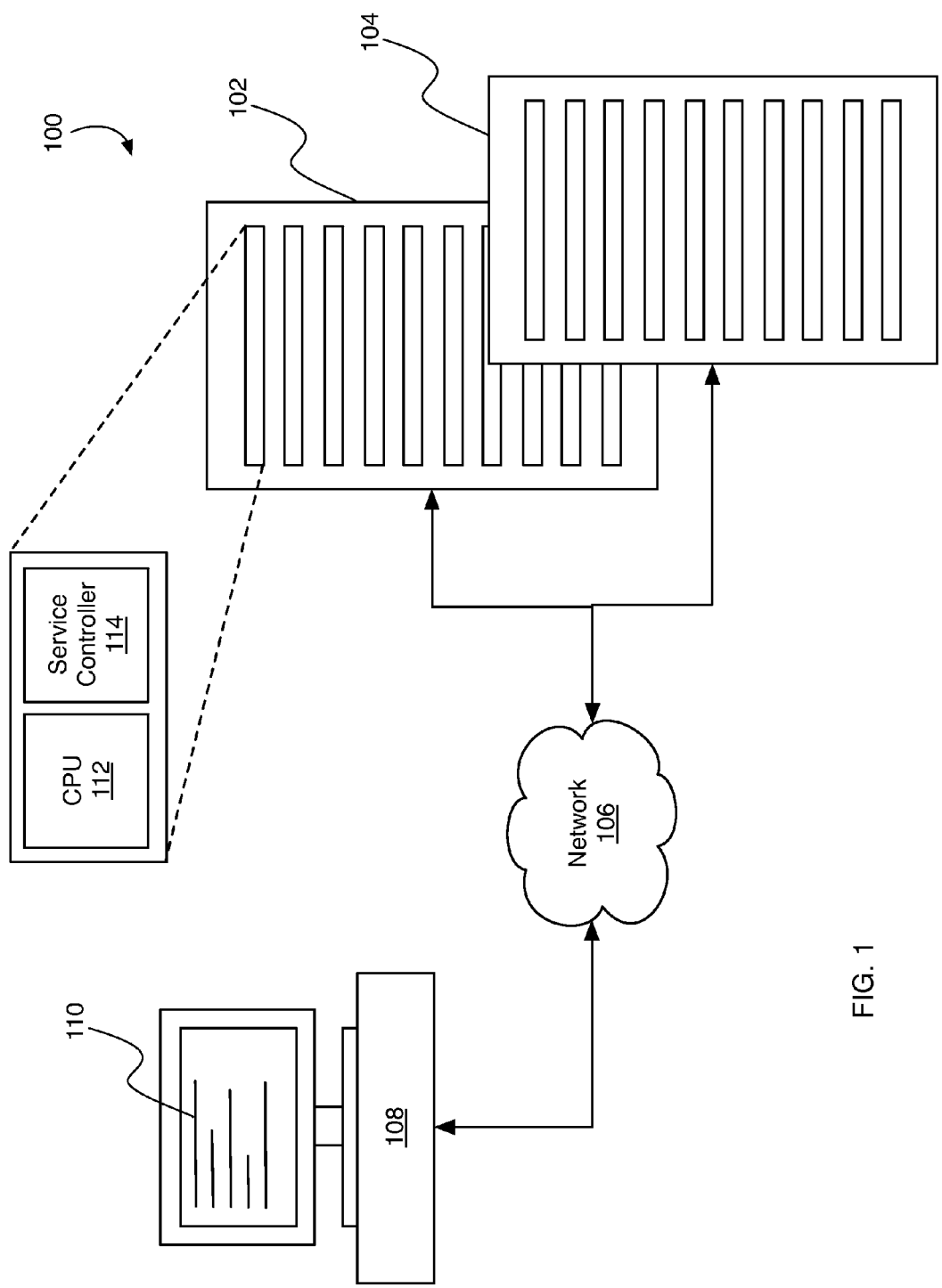
FIG. 1 illustrates an example system for retrieving console messages after a device failure.

Various embodiments of the present technology are discussed in detail below. While specific implementations are discussed, it should be understood that this is done for illustration purposes only. A person skilled in the relevant art will recognize that other components and configurations may be used without parting from the spirit and scope of the present technology.

According to present technology, a computing device can be configured with a service controller for storing and retrieving serial port output (e.g., console messages) generated by the computing device. For example, the service controller can be a baseband management controller (BMC) embedded in the motherboard of the computing device. The service controller can be a secondary controller in the computing device that operates independently of the computing device's central processing unit (CPU), for example.

According to some embodiments, the service controller can receive console messages (e.g., system error messages) generated by the main CPU (e.g., primary controller) and/or the operating system or BIOS of the monitored server. For example, the service controller can be configured to implement serial output (e.g., console message) redirection over a network interface (e.g., serial over LAN). While redirecting the console messages over the network, the service controller can store a portion of the console messages received (e.g., the last 20 messages received, the last 50 messages received, a configurable or pre-defined number of messages, etc.) in a memory (e.g. non-volatile RAM, volatile memory, etc.) associated with the service controller. For example, the service controller can store as many screens (e.g., a 25 row by 80 column display) of messages as will fit in the service controller memory. Later, after the computing device malfunctions, a system administrator can request the stored messages from the service controller. In response to the request, the service controller can send the stored console messages to a client device (e.g., an external monitoring device) so that an administrator (e.g., user) can read and analyze the console messages and determine the source of the malfunction.

According to some embodiments, upon rebooting (e.g., restarting, initializing, etc.) the computing device, the service controller can copy the console messages stored in non-volatile memory to persistent storage (e.g., a hard drive, flash drive, etc.). For example, copying the console messages to persistent storage upon boot up can prevent the console messages stored prior to the computing device's malfunction from being overwritten with new console messages generated during startup or initialization of the computing device.

In some embodiments, a service processor (e.g., a baseboard management controller) is an independent and embedded microcontroller that monitors and manages the operation status of a server. The service controller can receive data from sensors installed in the chassis (e.g temperature, humidity, power-supply voltage, fan speeds, communications parameters and operating system functions), and transmit these data to a server monitoring device through a dedicated two-way network interface (e.g. using a service processor dedicated network interface controller).

As a secondary service device that is independent from the main server and its operating system, the service controller enables out-of-band management of the monitored server. For example, because the service controller can operate independently of the CPU (e.g., out-of-band) the service controller can allow a server administrator to manage servers remotely regardless of whether the main CPU is powered on or if the operating system is functional.

Using the Serial over LAN (SOL) (e.g., serial output redirection), the service controller can allow a remote monitoring device to receive live serial output (e.g., console messages) in real time. For example, console messages can be lines of text (e.g., system log messages) generated by the main CPU, operating system and/or applications. Console messages can include, for example, system log messages, kernel log messages, BIOS messages, runtime messages, etc.

FIG. 1 illustrates an example system 100 for retrieving console messages after a device failure. For example, servers 102 and/or 104 can be configured to store console messages (i.e., the SOL serial output) such that the console messages can be retrieved by external device 108 after server 102 and/or server 104 crashes or otherwise fails. In some embodiments, one or more servers (e.g. 102 and 104) can connect to an external device 108 through a network 106. In some embodiments, the network can be dedicated for such connections. Each server, e.g. 102, can include a main CPU 112 and service controller 114. For example, main CPU can be configured with an operating system, e.g. LINUX, for performing basic operations of the server.

In some embodiments, service controller 114 can be a baseboard management controller that implements all or part of the Intelligent Platform Management Interface (IPMI) specification. For example, IPMI is an interface specification that provides for management and monitoring capabilities independent of main CPU 112. A system administrator can remotely manage and monitor a server 102 and/or server 104 from external device 108 (e.g., a remote client device) using an application that is configured according to the IPMI specification (e.g., an IPMI tool). For example, the system administrator can use an IPMI tool to monitor serial port output (e.g., console messages) from server 102 and/or server 104 and present the serial port output on a display coupled to external device 108.

According to some embodiments, while server 102 is running (e.g., the BIOS is running, the operating system is running, etc.), server 102 can generate system log messages (e.g., error messages) that are transmitted to the serial port of server 102. Service controller 114 can receive the system log messages destined for the serial port and redirect the system log messages to a network interface controller. Traditionally, the messages sent to the serial port are transient messages and once the messages reach the serial port or the network interface controller, the messages are no longer stored on server 102. To allow for later analysis, service controller 114 can store the system log messages in a memory, such as a hard drive in server 102. At a later point, a server administrator can retrieve system log messages 110 through network 106 and analyze system log messages 110 on external device 108.

As shown in FIG. 1, each of one or more servers (e.g. 102, 104), and external device 108 can include any appropriate device operable to send and receive requests, messages, or information over an appropriate network. Examples of such devices include a server, a desktop computer, a laptop computer, a portable electronic device such as a tablet, a mobile phone, and the like. Network 106 can be substituted with any appropriate network, including a local area network, wide area network, an intranet, the Internet, a cellular network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

Figure 2:
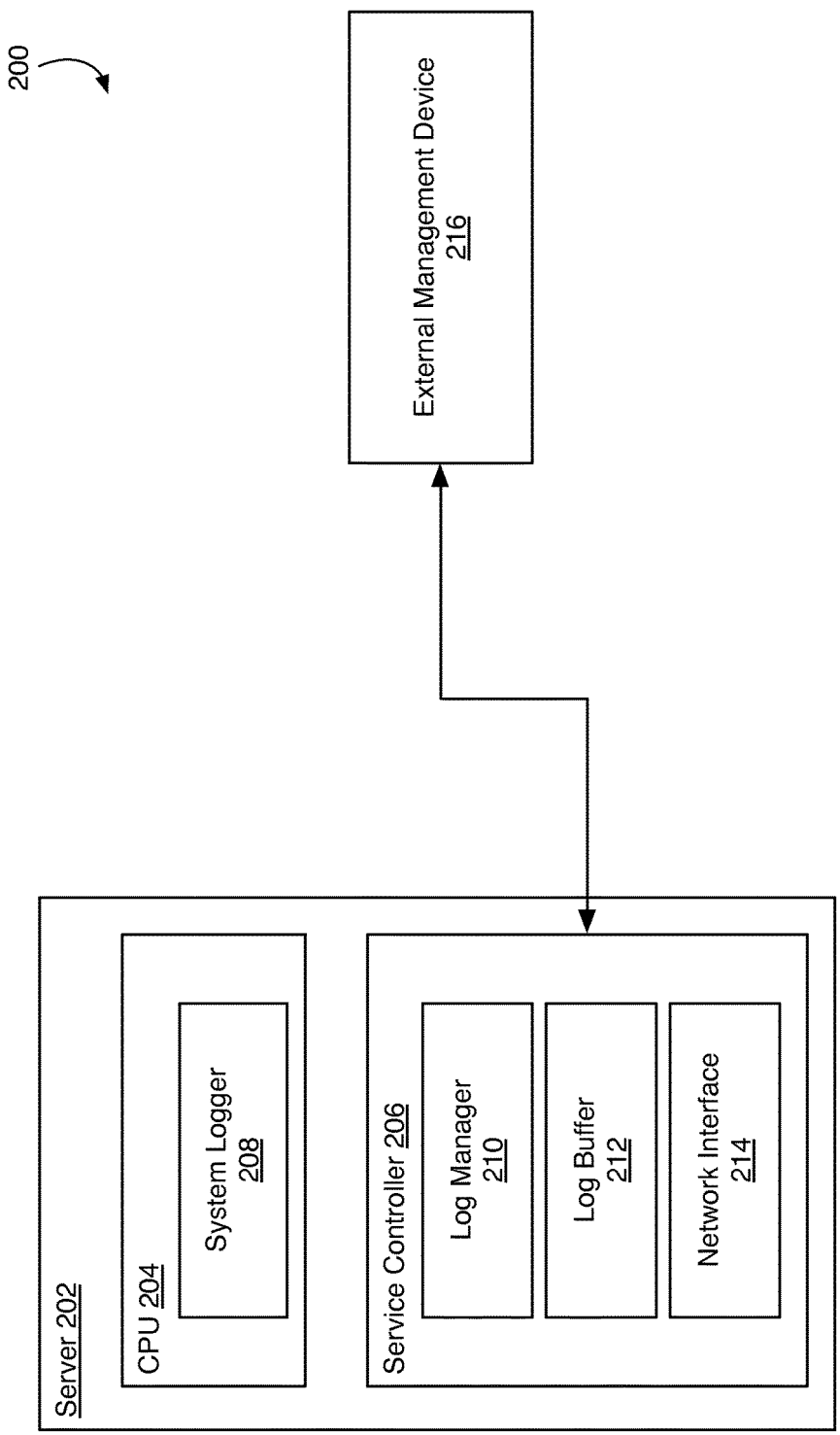
FIG. 2 is a block diagram illustrating an example system for storing console messages at a server.

FIG. 2 is a block diagram illustrating an example system 200 for storing console messages at a server. According to some embodiments, server 202 can include CPU 204 and service controller 206. CPU 204 can be configured with system logger 208 that generates log messages and outputs the log messages to a console or serial port of server 202. For example, system logger 208 can implemented within an operating system or BIOS function (e.g., software, firmware, embedded software, etc.). Thus, system logger 208 can receive messages generated by the operating system or other software running on server 202 and output the messages to the console or serial port of server 202.

In some embodiments, service controller 206 can include log manager 210. For example, log manager 210 can receive system log messages from system logger 208. Log manager 210 can be software, firmware, etc., configured on service controller 206 for storing messages in log buffer 212. For example, after receiving the system log messages, log manager 210 can store the system log messages in log buffer 212. Log buffer 212 can be a non-volatile storage medium (e.g., flash memory) associated with service controller 206.

In some embodiments, service controller 206 can send the system log messages to external management device 216 through network interface controller 214. For example, at or near the same time that log manager 210 is storing the received system log messages in log buffer 212, service controller 206 can send the system log messages to external management device 216. For example, external management device 216 can connect to service controller 206 through the service controller dedicated network interface controller 214. External management device 216 can request system log messages (e.g., serial output, console messages, etc.) through the IPMI compliant interface of service controller 214.

According to some embodiments, external management device 216 can request stored system log messages from service controller 206. For example, external management device 216 can request system log messages stored in log buffer 212 by invoking a stored message retrieval interface and function configured on service controller 206. When external management device 216 requests the stored system error messages, service controller 206 (e.g., log manager 210) can retrieve the system log messages stored in log buffer 212 and send the system log messages to external management device 216 using dedicated network interface controller 214. For example, network interface controller 214, which is associated with IP addresses/ports for service controller 206, can be used to establish the network connection between service controller 206 and external management device 216.

According to some embodiments, external management device 216 can receive the system log messages when server 202 is shutdown, powered off, crashed, or otherwise inoperative. For example, because service controller 206 can operate independently of CPU 204, service controller 206 can be powered and operational even when CPU 204 is shut down. Thus, external management device 216 can connect to service controller 206 and request system log messages even when CPU 204 is shut down.

Figure 3:
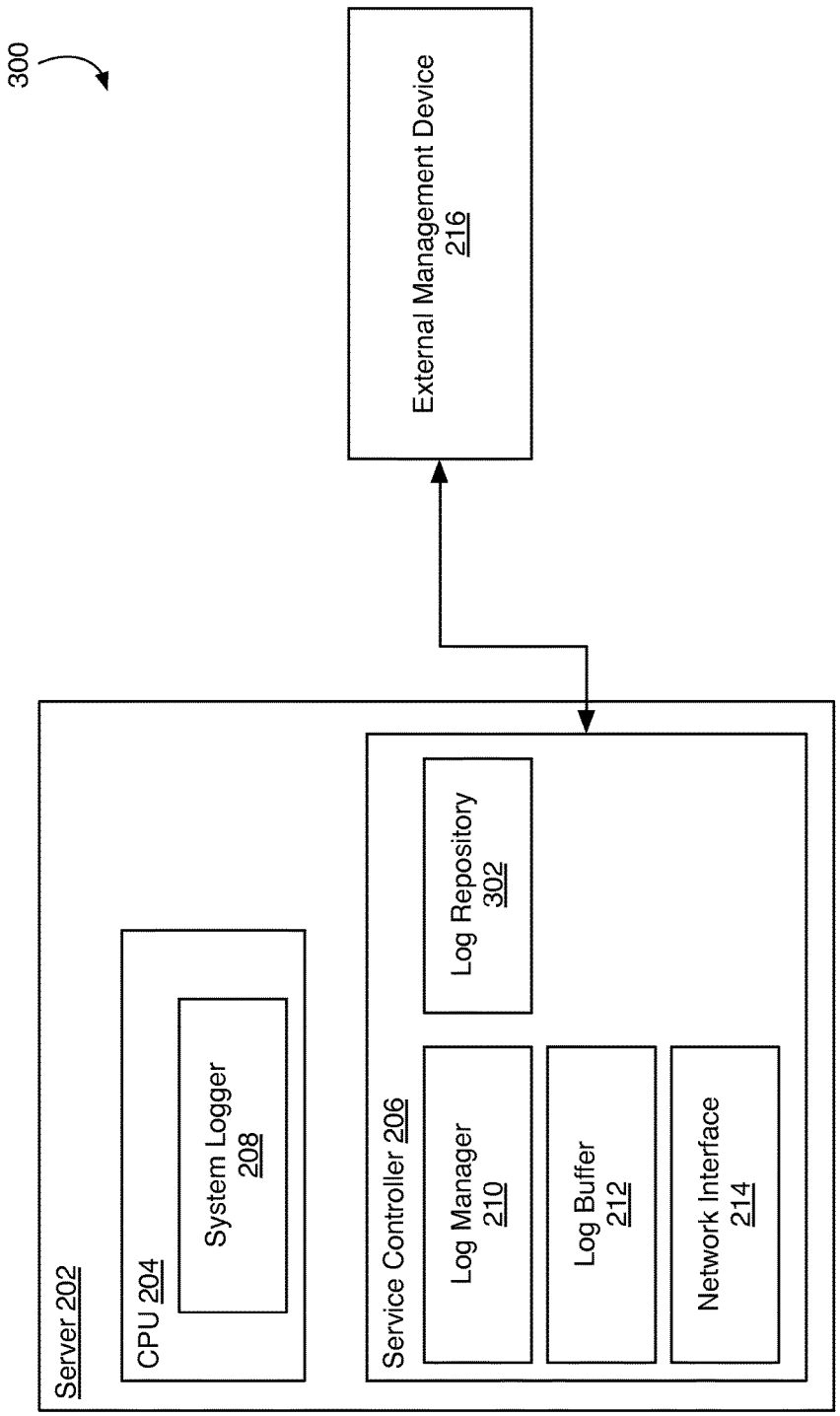
FIG. 3 is a block diagram illustrating an example system configured for copying stored console messages to persistent storage upon startup of a server.

FIG. 3 is a block diagram illustrating an example system 300 configured for copying stored console messages to persistent storage upon startup of a server. In some embodiments, service controller 206 (e.g., log manager 210) can copy system log messages stored in log buffer 212 to log repository 302 upon startup of CPU 204 and/or the server's BIOS or operating system. According to some embodiments, after storing system log messages in log buffer 212, service controller 206 (e.g., log manager 210) can determine a possibility that log buffer 212 is subject to data loss, and then copy and save the system log messages to a permanent storage medium, such as log repository 302. Potential reasons that cause the data loss in log buffer 212 include a power loss at service controller 206, data overflow at log buffer 212, data rewritten at log buffer 212, etc. For example, during a power loss at server 202, service controller 206 can determine a restart of server 202 through reading data from the power voltage meter. Because the restart of server 202 can generate new system log messages that overwrites on the stored error messages, service controller 206 can store the system log messages in log repository 302 to prevent data loss.

According to some embodiments, service controller 206 can autonomously duplicate the system log messages in log buffer 212 and store another copy in log repository 302, without determining a possibility of data loss at log buffer 212. The automatic duplicate storage can ensure the reservation of system error messages when service controller 206 has a limited RAM volume.

For example, when server 202 crashes or malfunctions, the system administrator may restart server 202 using external management device 216. External management device 216 can send a restart (e.g., boot, power on, etc.) signal to service controller 206 through network interface controller 214. Upon receiving the restart signal, service controller 206 (e.g., using log manager 210) can automatically copy the system log messages from log buffer 212 to log repository 302. For example, log repository 302 can be persistent storage, such as a hard drive, flash drive, or other storage. The system log messages are copied to log repository 302 so that the system log messages stored in log buffer 212 before a crash or malfunction will not be lost when server 202 starts up and log manager 210 begins writing system log messages to log buffer 212 again.

In some embodiments, external management device 216 can request the system error messages from log repository 302. For example, external management device 216 can request that service controller 204 send the persistently stored system log messages. Upon receiving the request, service controller 206 can retrieve the system error messages from log repository 302, and transmit the system error messages to external management device 216.

Figure 4:
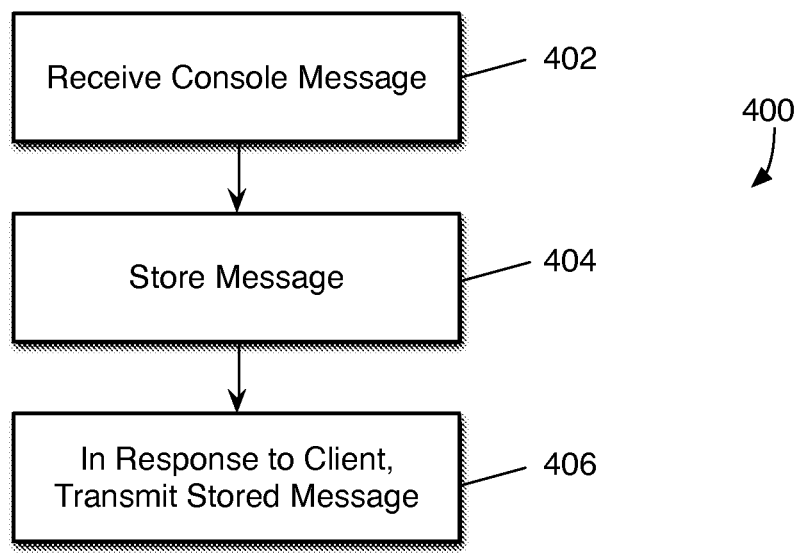
FIG. 4 is a flow diagram of an example process for retrieving console messages after a device failure.

FIG. 4 is a flow diagram of an example process 400 for retrieving console messages after a device failure. It should be understood that there can be additional, fewer, or alternative steps performed in similar or alternative orders, or in parallel, within the scope of the various embodiments unless otherwise stated. At 402, a service controller can receive a console message from the CPU of a computing device. For example, the console message can be serial output generated by the computing device. The console message can be a system log (e.g., error) message generated by the computing device.

At 404, the service controller can store the at least one console message in a memory of the service controller. For example, while the service controller is redirecting the serial output (e.g., console messages, system log messages, system error messages) to the network interface controller for transmission over the network, the service controller can store a copy of the console message to a buffer (e.g., memory) associated with the service controller. The memory can be a volatile memory (e.g. RAM) of the service controller. The memory can be non-volatile memory so that the service controller can retrieve the console message even after a power failure, server crash or other malfunction.

At 406, the service controller can transmit the stored console message to an external device in response to a client request. For example, after a malfunction of the server, a system administrator can request (e.g., using an external management device) the console messages stored by the service controller. The request can be sent to the service controller from a remote external management device over a network (e.g., the Internet). Upon receiving the request for the stored console messages, the service controller can retrieve the console messages from the non-volatile memory and send the console messages to the external management device. Thus, the system administrator can retrieve and view console messages after a server crash that would otherwise be unavailable if the system administrator was not monitoring console messages during the crash.

Figure 5:
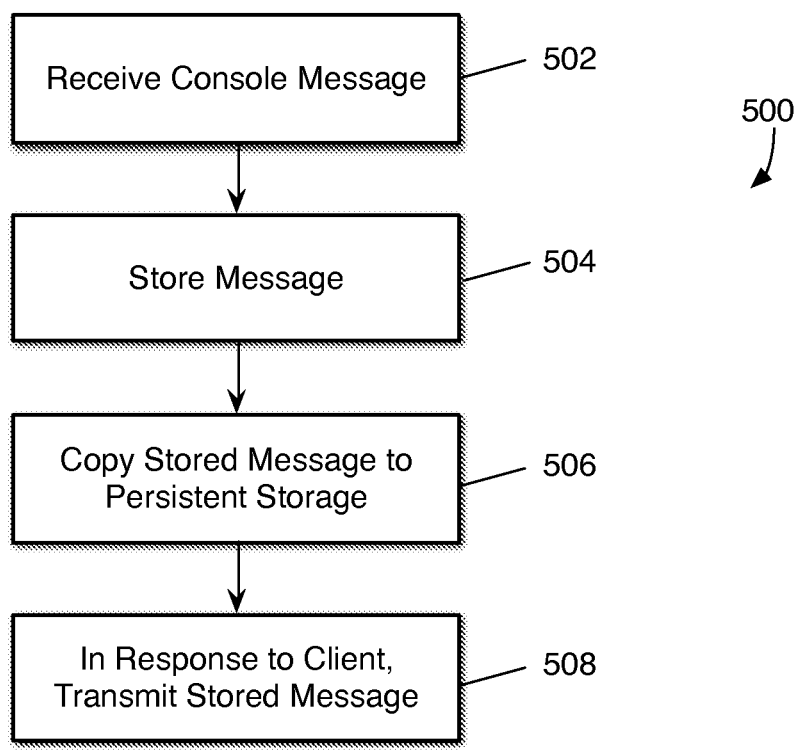
FIG. 5 is a flow diagram of an example process for retrieving console messages from persistent storage after a device failure.

FIG. 5 is a flow diagram of an example process 500 for retrieving console messages from persistent storage after a device failure. It should be understood that there can be additional, fewer, or alternative steps performed in similar or alternative orders, or in parallel, within the scope of the various embodiments unless otherwise stated. At 502, a service controller can receive a console message from the CPU of a computing device. For example, the console message can be serial output generated by the computing device. The console message can be a system log (e.g., error) message generated by the computing device.

At 504, the service controller can store the console message in a memory of the service controller. For example, while the service controller is redirecting the serial output (e.g., console messages, system log messages, system error messages) to the network interface controller for transmission over the network, the service controller can store a copy of the console message to a buffer (e.g., memory) associated with the service controller. The memory can be non-volatile memory so that the service controller can retrieve the console message even after a power failure, server crash or other malfunction.

At 506, the service controller can copy the stored console message to persistent storage. For example, the service controller can detect that the computing device (e.g., CPU, BIOS, operating system) is being powered on or is beginning its initialization process. The service controller can detect a power on or boot up signal received by the computing device, for example. The service controller can detect a state change at the CPU, BIOS or operating system that indicates that the computing device is booting up. Upon detecting that the computing device is powering up, the service controller can copy the console messages stored in memory at 504 to persistent storage (e.g., a hard drive, flash drive, or other storage location).

At 508, the service controller can transmit the persistently stored console message to an external device in request to a client request. For example, after a malfunction of the server, a system administrator can request (e.g., using an external management device) the persistently stored console messages that were copied to storage by the service controller. The request can be sent to the service controller from a remote external management device over a network (e.g., the Internet). Upon receiving the request for the persistently stored console messages, the service controller can retrieve the console messages from persistent storage and send the console messages to the external management device. Thus, the system administrator can retrieve and view console messages after a server crash that would otherwise be unavailable if the system administrator was not monitoring console messages during the crash.

Figure 6:
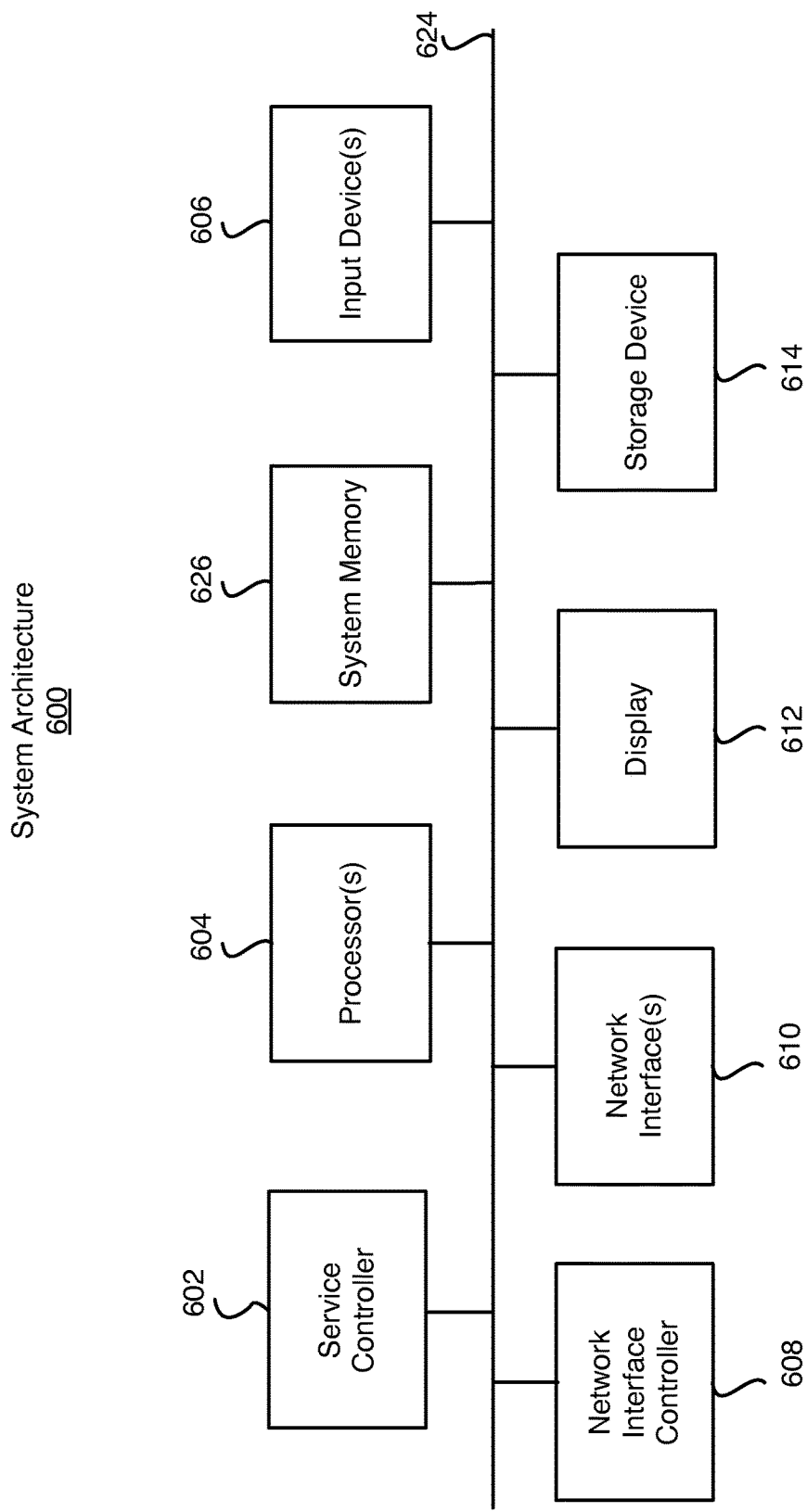
FIG. 6 illustrates an example system architecture for implementing the systems and processes of FIGS. 1-5.

FIG. 6 illustrates an example system architecture 600 for implementing the systems and processes of FIGS. 1-5. Computing platform 600 includes a bus 624 which interconnects subsystems and devices, such as service controller 602, processor 604, storage device 614, system memory 626, a network interface(s) 610 (e.g., an Ethernet or wireless controller, a Bluetooth controller, etc.), a service controller dedicated network interface controller 608 to facilitate out-of-band communications with service controller 602. Processor 604 can be implemented with one or more central processing units ("CPUs"), such as those manufactured by Intel® Corporation, or one or more virtual processors, as well as any combination of CPUs and virtual processors. Computing platform 600 exchanges data representing inputs and outputs via input-and-output devices input devices 606 and display 612, including, but not limited to, keyboards, mice, audio inputs (e.g., speech-to-text devices), user interfaces, displays, monitors, cursors, touch-sensitive displays, LCD or LED displays, and other I/O-related devices.

According to some examples, computing architecture 600 performs specific operations by processor 604 executing one or more sequences of one or more instructions stored in system memory 626. Computing platform 600 can be implemented as a server device or client device in a client-server arrangement, peer-to-peer arrangement, or as any mobile computing device, including smart phones and the like. Such instructions or data may be read into system memory 626 from another computer readable medium, such as storage device 614. In some examples, hard-wired circuitry may be used in place of or in combination with software instructions for implementation. Instructions may be embedded in software or firmware. The term "computer readable medium" refers to any tangible medium that participates in providing instructions to processor 604 for execution. Such a medium may take many forms, including but not limited to, non-volatile media and volatile media. Non-volatile media includes, for example, optical or magnetic disks and the like. Volatile media includes dynamic memory, such as system memory 626.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 624 for transmitting a computer data signal.

In the example shown, system memory 626 can include various modules that include executable instructions to implement functionalities described herein. In the example shown, system memory 626 includes a log manager, a log buffer, or a log repository, each can be configured to provide one or more functions described herein.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed is:

1. A method comprising:
   receiving, at a baseboard management controller of a first computing device, one or more console messages comprising system error messages for debugging the first computing device destined for a serial port of the first computing device;
   storing, by the baseboard management controller, the one or more console messages in non-volatile storage associated with the baseboard management controller;
   receiving, by the baseboard management controller, a request for one or more stored console messages;
   determining, via the baseboard management controller, that the first computing device has a malfunction;
   retrieving, by the baseboard management controller, the one or more stored console messages from the non-volatile storage associated with the baseboard management controller; and
   transmitting, by a Network Interface Controller of the baseboard management controller, the one or more console messages to a second computing device using serial over Local Area Network when the first computing device is inoperative.

2. The method of claim 1, wherein the request is received through the network interface controller corresponding to the baseboard management controller.

3. The method of claim 1, wherein the storing comprises selecting the one or more console messages to be a predefined number of the one or more console messages most recently received at the baseboard management controller.

4. The method of claim 1, wherein the one or more console messages include system error messages for debugging the first computing device.

5. The method of claim 1, further comprising:
   detecting that the first computing device is powering on; and
   copying the one or more stored console messages from the non-volatile storage to persistent storage on the first computing device.

6. The method of claim 1, further comprising:
   determining a data loss possibility in the non-volatile storage associated with the baseboard management controller based at least in part on detecting a power loss of the baseboard management controller, detecting a data overflow at the non-volatile storage, or detecting a data rewriting action at the non-volatile storage;

copying the one or more stored console messages from the non-volatile storage; and storing the one or more stored console messages in a persistent storage associated with the first computing device.

7. The method of claim 6, further comprising:

transmitting the one or more stored console messages in the persistent storage to a second computing device.

8. A non-transitory computer-readable medium including one or more sequences of instructions which, when executed by a baseboard management controller of a first computing device, causes:

receiving, at the baseboard management controller of the first computing device, one or more console messages comprising system error messages for debugging the first computing device destined for a serial port of the first computing device;

storing, by the baseboard management controller, the one or more console messages in non-volatile storage associated with the baseboard management controller;

receiving, by the baseboard management controller, a request for one or more stored console messages;

determining that the first computing device has a malfunction;

retrieving the one or more stored console messages from the non-volatile storage associated with the baseboard management controller; and transmitting, by a Network Interface Controller of the baseboard management controller, the one or more console messages to a second computing device using serial over Local Area Network when the first computing device is inoperative.

9. The non-transitory computer-readable medium of claim 8, wherein the request is received through the network interface controller corresponding to the baseboard management controller.

10. The non-transitory computer-readable medium of claim 8, the storing comprises selecting the one or more console messages to be a pre-defined number of the one or more console messages most recently received at the baseboard management controller.

11. The non-transitory computer-readable medium of claim 8, wherein the one or more console messages include system error messages for debugging the first computing device.

12. The non-transitory computer-readable medium of claim 8, wherein the instructions cause:

detecting that the first computing device is powering on; and copying the one or more stored console messages from the non-volatile storage to persistent storage on the first computing device.

13. The non-transitory computer-readable medium of claim 8, wherein the instructions cause:

determining a data loss possibility in the non-volatile storage associated with the baseboard management controller based at least in part on detecting a power loss of the baseboard management controller, detecting a data overflow at the non-volatile storage, or detecting a data rewriting action at the non-volatile storage;

copying the one or more stored console messages from the non-volatile storage; and storing the one or more stored console messages in a persistent storage associated with the first computing device.

14. The non-transitory computer-readable medium of claim 13, wherein the instructions cause:

transmitting the one or more stored console messages in the persistent storage to a second computing device.

15. A system comprising:

at least one processor;

a baseboard management controller; and a computer-readable medium including one or more sequences of instructions which, when executed by the baseboard management controller, causes:

receiving, at the baseboard management controller of the system, one or more console messages comprising system error messages for debugging a first computing device destined for a serial port;

storing, by the baseboard management controller, the one or more console messages in non-volatile storage associated with the baseboard management controller;

receiving, by the baseboard management controller, a request for one or more console messages from a requesting computing device;

retrieving the one or more console messages from the non-volatile storage associated with the baseboard management controller; and transmitting, by a Network Interface Controller of the baseboard management controller, the one or more stored console messages to the requesting computing device using serial over Local Area Network when the at least one processor is inoperative.

16. The system of claim 15, wherein the at least one processor comprises a central processing unit.

17. The system of claim 15, wherein the network interface controller is dedicated to the baseboard management controller, wherein the request is received through the network interface controller.

18. The system of claim 15, wherein the storing comprises selecting the one or more console messages to be a pre-defined number of the one or more console messages most recently received at the baseboard management controller.

19. The system of claim 15, wherein the one or more console messages include system error messages for debugging the system.

20. The system of claim 15, wherein the instructions cause:

detecting that the system is powering on; and copying the one or more stored console messages from the non-volatile storage to persistent storage on the system.

21. The system of claim 15, wherein the instructions cause:

determining a data loss possibility in the non-volatile storage associated with the baseboard management controller based at least in part on detecting a power loss of the baseboard management controller, detecting a data overflow at the non-volatile storage, or detecting a data rewriting action at the non-volatile storage;

copying the one or more stored console messages from the non-volatile storage; and storing the one or more stored console messages in a persistent storage associated with the first computing device.

22. The system of claim 21, wherein the instructions cause:

transmitting the one or more stored console messages in the persistent storage to a second computing device.

* * * * *